US007756614B2

(12) United States Patent
Jouppi (10) Patent No.: US 7,756,614 B2
(45) Date of Patent: Jul. 13, 2010

(54) MOBILE DEVICE CONTROL SYSTEM

(75) Inventor: Norman Paul Jouppi, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1126 days.

(21) Appl. No.: 10/789,669

(22) Filed: Feb. 27, 2004

(65) Prior Publication Data

US 2005/0192721 A1 Sep. 1, 2005

(51) Int. Cl.
*G05D 1/02* (2006.01)
*G06N 3/00* (2006.01)
(52) U.S. Cl. ............... 701/25; 700/245; 700/246; 700/259; 701/24; 348/211.1; 398/118
(58) Field of Classification Search ............... 701/24
See application file for complete search history.

(56) References Cited

U.S. PATENT DOCUMENTS

| | | | | |
|---|---|---|---|---|
| 4,964,331 A * | 10/1990 | Halevy et al. | ............... | 89/37.19 |
| 5,111,401 A | 5/1992 | Everett, Jr. et al. | | |
| 5,799,154 A * | 8/1998 | Kuriyan | ............ | 709/223 |
| 6,292,713 B1 * | 9/2001 | Jouppi et al. | ............ | 700/245 |
| 6,377,875 B1 * | 4/2002 | Schwaerzler | ............ | 701/2 |
| 6,459,955 B1 * | 10/2002 | Bartsch et al. | ............ | 700/245 |
| 6,859,729 B2 * | 2/2005 | Breakfield et al. | ........ | 701/216 |
| 6,879,879 B2 * | 4/2005 | Jouppi et al. | ............ | 700/259 |
| 6,920,376 B2 * | 7/2005 | Jouppi et al. | ............ | 700/259 |
| 7,184,559 B2 * | 2/2007 | Jouppi | ............ | 381/259 |
| 7,221,909 B2 * | 5/2007 | Kiyose | ............ | 455/41.2 |
| 2001/0037163 A1 * | 11/2001 | Allard | ............ | 700/245 |
| 2002/0173877 A1 * | 11/2002 | Zweig | ............ | 700/245 |
| 2003/0219253 A1 * | 11/2003 | Kukshya et al. | ............ | 398/118 |
| 2004/0193334 A1 * | 9/2004 | Carlsson et al. | ............ | 701/9 |
| 2004/0249519 A1 * | 12/2004 | Frink | ............ | 701/3 |
| 2005/0076242 A1 * | 4/2005 | Breuer | ............ | 713/201 |
| 2006/0161223 A1 * | 7/2006 | Vallapureddy et al. | ........ | 607/60 |
| 2008/0086236 A1 * | 4/2008 | Saito et al. | ............ | 700/245 |

FOREIGN PATENT DOCUMENTS

| | | | | |
|---|---|---|---|---|
| JP | 2000031894 A | * | 1/2000 | |
| JP | 2004260769 A | * | 9/2004 | |
| JP | 2005025516 A | * | 1/2005 | |
| WO | WO 9851078 A1 | * | 11/1998 | |

OTHER PUBLICATIONS

"Mobile Robot Survival", Fred R. Sias Jr. & Frank Heckendom, Southeastcon'88, IEEE Conference Proceedings, pp. 497-501.*
Nguyen, Pezeshkian, Gupta & Farrington "Maintaining Communication Link for a Robot Operating in a Hazardous Environment", ANS 10th Int Conf on Robotics and Remote Systems for Hazardous Environments, Mar. 28-31, 2004.*

(Continued)

Primary Examiner—Thomas G Black
Assistant Examiner—Lin B Olsen (57) ABSTRACT

A system of mobile device control is provided, which includes moving a surrogate under wireless control, and autonomously moving the surrogate to regain wireless control when the wireless control is lost.

27 Claims, 4 Drawing Sheets

OTHER PUBLICATIONS

Richardson & Rodgers, "Vision-based semi-autonomous outdoor robot system to reduce soldier workload", Proceedings of SPIE vol. 4363, 2001 pp. 12-18.*

PRoP: Personal Roving Presence, Eric Paulos & John Canny, 8 pagesm ACM SIGCHI 1998, from http://www.prop.org/papers/index.htm.*

A System for Semi-Autonomous Tractor Operations, A. Stentz, C. Dima, C Wellington, H.Herman, & D. Stager, Autonomous Robots 13, 87-104, 2002.*

James H. Gordon, "Research Issues in Robot Safety", CH2555-1/88/0000/1854, 1988 IEEE, pp. 1854-1855.*

Norman P. Jouppi, "First Steps Toward Mutually-Immersive Mobile Telepresence", CSCW '02, Nov. 16-20, 2002, Pub by ACM.*

"The Ominous Mail Delivery Robot", posted Apr. 12, 2001m http://everything2.com/node/1014976 also http://everything2.com/title/The+Ominous+Mail+Delivery+Robot.*

U.S. Appl. No. 10/285,726, filed Oct. 31, 2002, titled "Mutually-Immersive Mobile Telepresence System With User Rotation and Surrogate Translation" by Norman Paul Jouppi and Vaughan Stanton Thomas.

* cited by examiner

MOBILE DEVICE CONTROL SYSTEM

BACKGROUND OF THE INVENTION

1. Technical Field

The present invention relates generally to robotics, and more specifically to mobile telepresence systems.

2. Background Art

In robotic telepresence, a remotely controlled robot simulates the presence of a user. The overall experience for the user and the participants interacting with the robotic telepresence device is similar to videoconferencing, except that the user has a freedom of motion and control over the robot and video input that is not present in videoconferencing. The robot platform typically includes a camera, a display device, a motorized platform that includes batteries, a control computer, and a wireless computer network connection.

SUMMARY OF THE INVENTION

The present invention provides a system of mobile telepresencing, which includes moving a surrogate under wireless control, and autonomously moving the surrogate to regain wireless control when the wireless control is lost.

DETAILED DESCRIPTION OF THE INVENTION

A Mutually-Immersive Mobile Telepresence System may have a mobile robot device of a humanoid as well as a non-humanoid shape, which is referred to as a "surrogate". A user is in a room that may show the surrogate's location and the surrogate may be located at a location, which may be a remote location. Video, audio, and motion control signals are transmitted between a user display and the surrogate by a wireless network, such as a wireless local area network or WLAN. The user is provided with views of the remote location on the user's display. These views look radially outward and 360-degrees around from the center of the surrogate in a surround view, which provides the user with the feeling of being present at the remote location. Likewise, the surrogate has display panels that project images of the user's head which provides the people or meeting participants at the remote location with the feeling that the user is present; i.e., the feeling of telepresence.

The user sits or stands inside a display cube, with rear-projection surfaces on the front, back, sides, and optionally the ceiling, showing the surrogate's location. Since the goal is to be mutually immersive, live color video images of the user, centered on the user's head, are acquired from all four sides of the user's location for transmission to the surrogate's location concurrent with projection of live color video surround from the surrogate's location. At the same time, live color video surround is projected from the surrogate's location onto the four sides of the display cube surrounding the user. The user can control movement of the surrogate in real time over the wireless network.

When using a wireless network, part of the remote location may not be covered by wireless services or may have dead zones. The range of WLAN access points are quite limited and large metal objects (such as HVAC ducts or elevators) can cause significant radio shadows. To date, WLANs have been deployed in unlicensed radio bands where power levels and signal strengths are limited. Furthermore, as higher and higher frequencies are utilized in order to achieve higher bandwidths, radio signals behave more like light rays and shadowing or blockage by metal objects becomes more pronounced.

If the user of the surrogate drives into an area without wireless coverage, the surrogate can effectively become disconnected from the user. Since the user is generally not at the remote location with the surrogate, the user cannot push the surrogate into an area with adequate wireless coverage. Moreover, since the connection to the surrogate from the user has been lost, the user cannot use the surrogate to ask people at the remote location to push the surrogate back into an area with adequate wireless coverage. Thus, it can be quite time consuming and inconvenient to regain connection to a surrogate that has moved outside areas with adequate wireless coverage.

It has been discovered that, it is desirable that the surrogate may have additional capabilities of autonomous navigation in situations where the user cannot find an alternative path with better wireless coverage or the user desires to travel to a specific destination at a remote location where part or all of the path is blocked from wireless coverage.

Figure 1A:
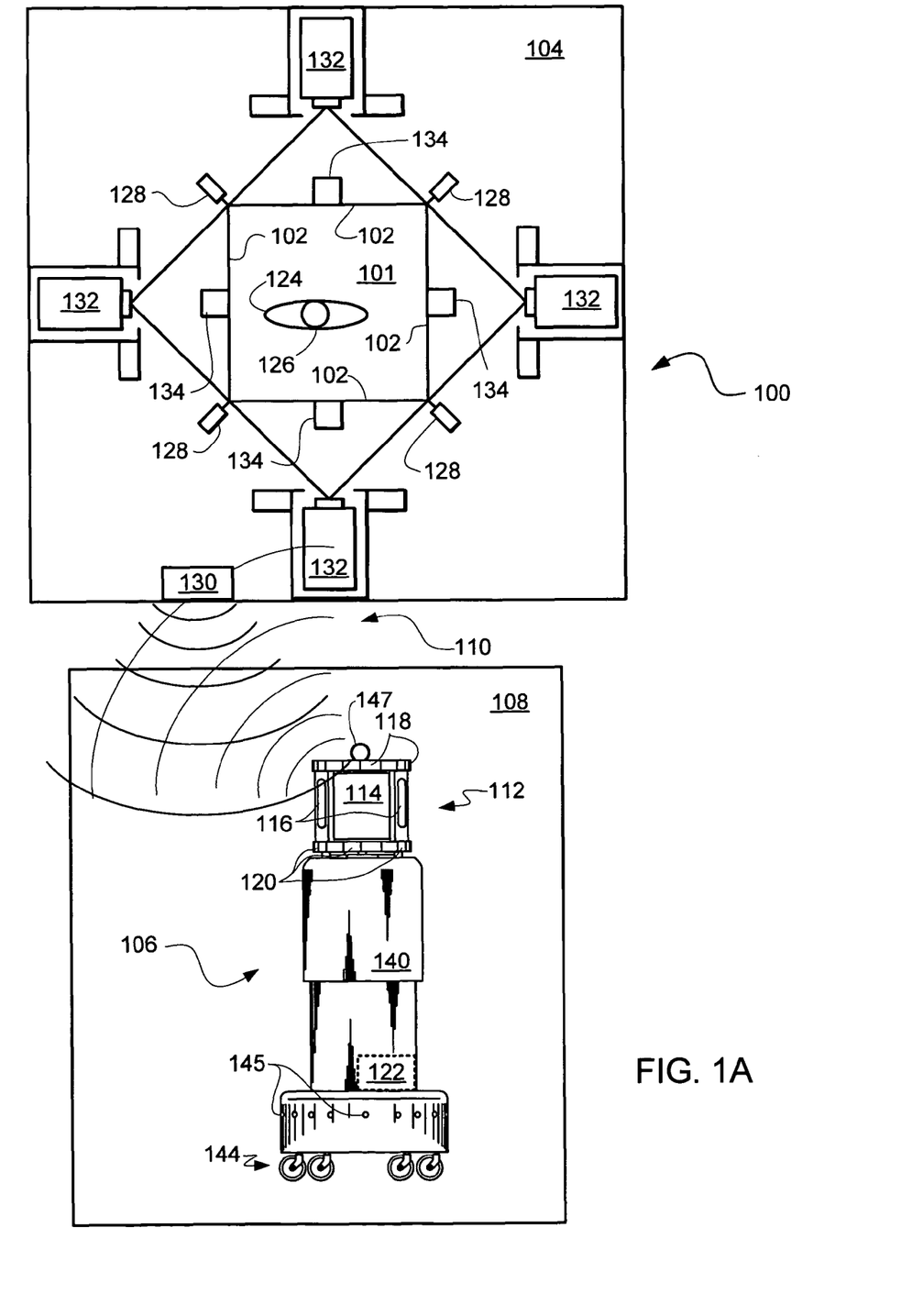
FIGS. 1A and 1B show views of a Mutually-Immersive Mobile Telepresence System in accordance with an embodiment of the present invention.
Figure 1B:
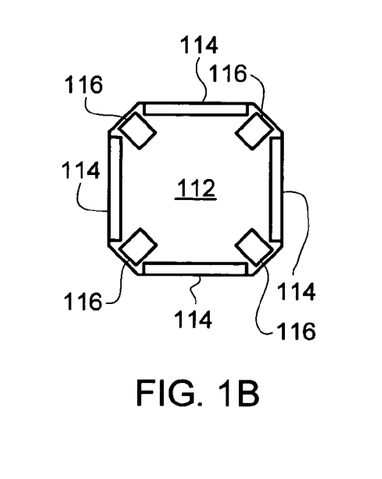

Referring now to FIGS. 1A and 1B, therein are shown views of a Mutually-Immersive Mobile Telepresence System 100, which includes a display cube 101 at a user's location 104 and a surrogate 106 at a surrogate's location 108. The surrogate 106 is connected to the display cube 101 via a high-speed network 110.

The surrogate 106 has a surrogate's head 112 including a number of head display panels 114, such as four liquid crystal display (LCD) panels. One or more cameras 116, such as four surrogate's cameras 116-1 through 4, are positioned in the corners of the surrogate's head 112. The surrogate's cameras 116 view and capture 360-degree surround live video at the surrogate's location 108 for display on the display cube 101. One or more microphones, such as four directional surrogate's microphones 118, are positioned in the top corners of the surrogate's head 112 to capture sounds 360 degrees around the surrogate 106. One or more speakers, such as the four surrogate's speakers 120 are also positioned in the bottom corners of the surrogate's head 112 to provide directional audio of the user's voice.

The surrogate 106 contains a surrogate's computer/transceiver system 122 connecting the surrogate's cameras 116, the surrogate's microphones 118, and the surrogate's speakers 120 with the display cube 101 for a user 124. The surrogate's computer/transceiver system 122 also receive live video views of the user's head 126 from user's camera arrays 128 at the four corners of the display cube 101 and display the live video views on the head display panels 114 in the surrogate's head 112.

The display cube 101 at the user's location 104 receives the live video and audio signals at user's computer/transceiver systems 130. The video view from the four surrogate's cameras 116 in the surrogate's head 112 are projected on projection screens 102 of the display cube 101 by four user's projectors 132.

User's speakers 134 are mounted above and below each projection screen 102. By powering each pair of user's speakers 134 with equal volume signals, the sound appears to come from the center of each of the projection screens 102 and provides directional audio or hearing of one or more participants from the four surrogate's microphones 118.

The user's computer/transceiver systems 130, which can be placed in an adjacent room (for sound isolation purposes), drive the user's speakers 134 with audio information transmitted from the surrogate 106 at the surrogate's location 108.

The images on the projection screens 102 are presented "life size". When the user's head 126 is centered in the display cube 101, the angle subtended by images on the projection screens 102 is roughly the same angle it would be at if the user 124 was actually at the surrogate's location 108 viewing it personally.

To have full surrogate mobility, the surrogate 106 can have remote translation and remote rotation capabilities. The term "translation" herein means linear movement of the surrogate 106, and the term "rotation" herein means turning movement of the surrogate 106.

When the user 124 desires to change body orientation with respect to the surrogate's location 108, the user 124 may do so by turning at the user's location 104 and having the surrogate 106 remain stationary. The head display panels 114 on the surrogate 106 show the user's head 126 turning to face the desired direction without movement or a rotation of the surrogate 106. In another embodiment, the surrogate 106 would be capable of turning.

The surrogate 106 has a surrogate's body 140, which is rotationally (circularly) symmetric and has no front, back, or sides (i.e., the base and body of the surrogate 106 are cylindrical). Furthermore, the surrogate 106 uses a mechanical drive system 144 that can travel in any translational direction without a need for rotation of the surrogate's body 140.

To prevent collisions between the surrogate 106 and remote objects while the user 124 is driving the surrogate 106, the surrogate 106 is equipped with distance-measuring and collision-avoidance devices 145, such as ultrasonic and/or infrared detectors, that can override the commands from the user 124 that can otherwise result in damage or unsafe operation.

In the present invention, forward movement is under real-time wireless user control while backtracking and predetermined routing is performed autonomously under the control of the surrogate's computer/transceiver system 122. Since the surrogate 106 is more prone to problems when it is traveling autonomously, an autonomous control warning 147 is provided to the people at the remote location by blinking a small yellow light and/or producing a quiet "backup beeper" type of audio warning (e.g. 1 kHz sine wave, 50% duty cycle per second).

Figure 2:
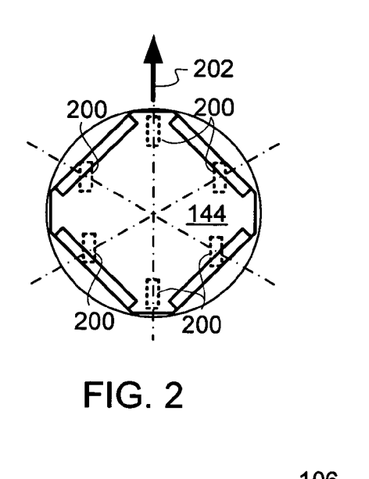
FIG. 2 is a plan view of a wheel configuration for a surrogate having six wheels.

Referring now to FIG. 2, therein is shown a plan view of a wheel configuration for a surrogate 106 having six wheels 200 set to go in a projected direction 202.

The steering angle of the wheels 200 in the base of the surrogate 106 is only important when the surrogate 106 is in translational motion. Thus, to save power and reduce noise and vibration while the surrogate 106 is at a fixed location, the steering angle of the wheels 200 may be left unchanged until the surrogate begins translational motion (i.e., a "lazy" update policy).

Figure 3:
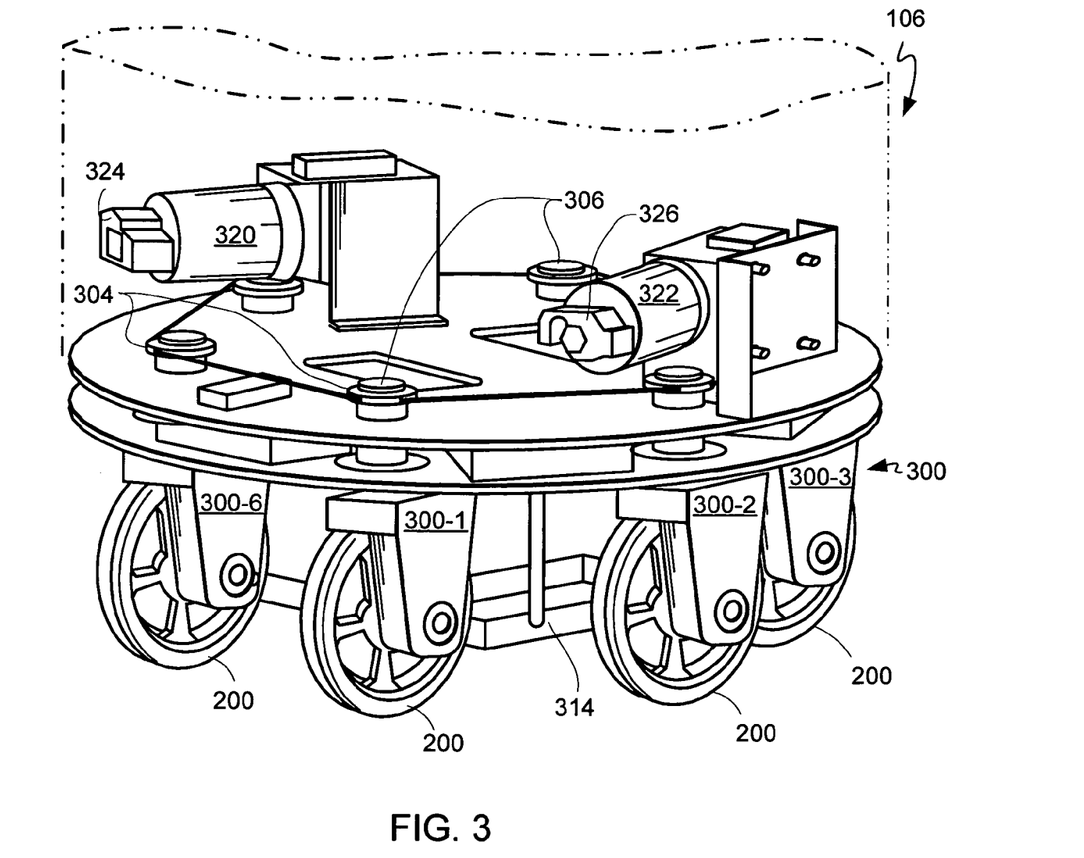
FIG. 3 is an isometric view of the surrogate using a steerable drive arrangement.

Referring now to FIG. 3, therein is shown an isometric view of the surrogate 106 using a steerable drive arrangement 300 for accomplishing translation in any direction at the surrogate's location 108 without rotation of the surrogate 106 itself.

The steerable drive arrangement 300 has steering gears 300-1 through 6 for the six wheels 200 (four shown). This provides enhanced stability over previous bases with three wheels. The wheels 200 are made large enough to surmount the largest vertical discontinuity allowed by the Americans with Disabilities Act.

Each wheel 200 can be steered through the use of a steering sprocket 304 and can be driven through a drive sprocket 306. All the wheels 200 are tied together by steering and drive chains so that they always face the same direction and rotate at the same speed. The wheels 200 are housed inside a cylindrical fairing (not shown), so that they are not easily visible to participants at the surrogate's location 108.

The user 124 using the surrogate 106 appears to glide over the floor in the direction that the video images of the user 124 are facing. When the user 124 turns and moves in another direction, the video images of the user 124 shows the rotation of the user's head 126 to a new orientation on the head display panels 114 of the surrogate 106. However, only the wheels 200 of the surrogate 106 under the fairing rotate and not the surrogate's body 140. Rotation of the wheels 200 about their steering axis encounters much less inertia than rotating the whole surrogate's body 140, and also uses less energy.

A support 314 hangs down from the center of the lower plate for supporting a battery (not shown).

In one embodiment of the present invention, distance-measuring and collision-avoidance hardware 145 is used to assist the user 124 in driving the surrogate 106 during normal operation. It is also used to help operate the surrogate 106 autonomously to "follow its footsteps" back into an area with adequate wireless coverage. Once in the area with adequate wireless coverage, the user 124 can regain control over the surrogate 106. The surrogate 106 only needs to back up by a limited amount, since the communication loss can be detected within several seconds (at most) of its occurrence.

If the surrogate 106 cannot reacquire communication with the user 124 after reversing a specific distance, it halts and waits. This is because the surrogate 106 has returned to an area where it previously had good communication with the user 124, and the inability to restore communication may be due to other causes such as a failure at some other point in the network.

In some situations, the surrogate 106 may not be able to return along the path previously taken due to the appearance of obstacles; e.g., a door has been closed behind it. In this case, the surrogate 106 will temporarily suspend backtracking, and try to keep a specified distance between the surrogate 106 and surrounding obstacles while remaining on the path by using the distance-measuring and collision-avoidance hardware 145 of FIG. 1.

It has been discovered that one common feature of many WLANs is that the supported bandwidth varies with distance and signal path quality to the access point. At significant distances from the access point, or if significant obstructions occur in the path to the access point for the surrogate 106, the communication can downshift to a much lower bandwidth. For example, systems complying with the 802.11g standard support data rates of 54, 48, 36, 24, 18, 12, 9, and 6 Mb/sec. If the surrogate 106 needs a data rate greater than the minimum data rate for normal operation (e.g., 10 Mb/sec), networking failures will occur when the surrogate 106 moves into an area supporting only a lower data rate. Such failures can consist of dropped packets or rapidly increasing latency, depending on the protocols and hardware being used. When the percentage of packets lost exceeds a threshold percentage or packet transmission delays exceed a time threshold, the surrogate 106 can treat the connection as effectively being lost and initiate backtracking.

It has also been discovered that traffic from other wireless clients can overload an access point being used by the surrogate 106. This can cause loss of packets or excessive packet delays. If these problems are transient (e.g., lasting less than several seconds), the surrogate 106 will not need to initiate backtracking. The automatic backtracking begins when a networking problem persists for several seconds or more.

During normal operation, the surrogate 106 keeps track of its relative location in real-time as the user 124 is driving it by monitoring position encoders on the wheels 200 of the surrogate 106. This type of navigation is called "dead reckoning".

In dead reckoning, the direction and distance traveled is summed with the previous distances and directions to compute a new position; i.e., vector addition in the X-Y plane. Although inaccuracies in direction or distance measurements can accumulate over time, the surrogate 106 will only need to backtrack a short distance.

To make distance measurements, the wheels 200 (or equivalently the wheel motors) of the surrogate 106 can have position encoders from which distance measurements can be obtained by odometry. While errors can be introduced in the distance measurement, backtracking will often cancel out these errors. These errors are introduced for example by compliance of the wheels 200 changing effective wheel radius, wheel slippage, and travel over uneven surfaces. However, it has been discovered since only relatively small backtracking distances are involved, the errors are not significantly compounded.

Directional measurements may be made using a number of different methods. One method is to measure direction by means of external signals. The surrogate 106 can contain an electromagnetic compass, which is used to read direction while the surrogate 106 is in motion and the directional changes logged by the surrogate's computer/transceiver system 122. The log can then be used when backtracking is required. In outdoor environments, the surrogate 106 can contain a satellite-signal-based global positioning system (GPS) receiver, which can also be used to provide the direction of motion. The drawback of electronic compasses is that they can sometimes take several seconds to settle on an accurate heading, and the drawback of GPS receivers is that they do not work indoors.

A second method involves determining direction using internal measurements. Gyroscopic devices can be used to determine the relative direction of motion of the surrogate 106. However, gyroscopic devices are expensive.

A third method of determining direction is by using odometry. Odometry measures distance by wheel rotation, and it can also be used to measure relative direction. Different methods are used based on the robotic drive system employed by the surrogate 106.

In one embodiment of the surrogate 106 described above, a holonomic platform with synchronous drive is used. A holonomic platform can move in any direction without requiring turning of the platform. For example, the six wheels 200 of FIG. 2 effectively drive and steer synchronously. The direction can be inferred from encoders on the steering shaft or motor. For example, steering and drive motors 320 and 322 are respectively provided with direction and distance encoders 324 and 326.

Figure 4:
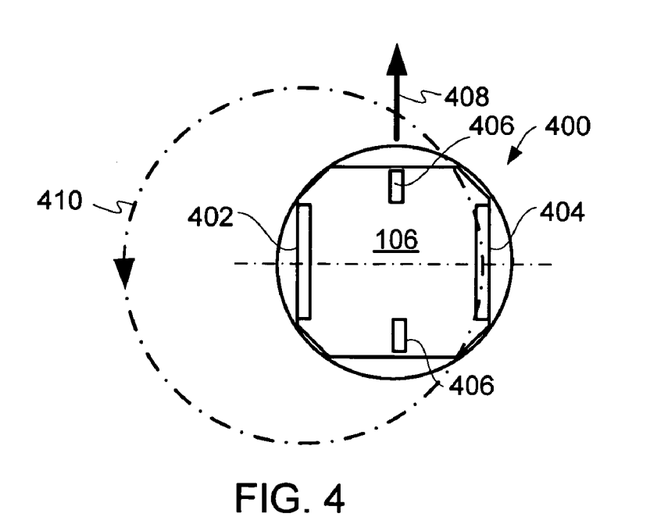
FIG. 4 is a view of a differential drive system in accordance with another embodiment of the present invention.

Referring now to FIG. 4, therein is shown a differential drive system 400 in accordance with another embodiment of the present invention. The differential drive system 400 both drives and steers with left and right wheels 402 and 404, respectively, mounted on two sides of the surrogate 106. The differential drive system 400 is not holonomic and the platform is turned to steer. For added stability, the differential drive system 400 has additional small non-driven caster wheels 406.

By mounting the left and right wheels 402 and 404 at the center of the sides of the surrogate 106, the surrogate 106 can turn in place by controlling the direction of the wheels so that one wheel rotates clockwise and the other counterclockwise.

In the differential drive system 400, the direction is a function of the relative motion of the left and right wheels 402 and 404. For example, if the left wheel 402 is rotating forward slower than the right wheel, the surrogate 106 is rotating to the left (i.e., counterclockwise as seen from above in a circular direction 410) as well as moving forward in a direction 408. More precisely, the rate of turn is a function of the difference in wheel rotation speeds, so when the surrogate 106 is turning in a circle 406 to the left, the left wheel 402 will be stationary and the right wheel 404 will be turning.

When one wheel has turned a distance on the ground equal to $\pi/2$ times the spacing R between the left and right wheels 402 and 404, the surrogate 106 will have rotated 90 degrees. The spacing between the left and right wheels 402 and 404 is measured from the point where one wheel touches the ground to the same point on the other wheel. More generally, during a time period, if the right wheel 404 has traveled distance D further than the left wheel 402, then the surrogate 106 has turned left (counterclockwise as seen from above) by $(\pi*R*180)/D$ degrees. If the wheels contact the ground over a large area (e.g. tank-type treads), uncertainty is added to the computation due to variations in wheel slippage.

It has been discovered that if directions are computed often enough (e.g., at 100 ms intervals), the average direction between one measurement and the next can be assumed to be valid for the whole time period between measurements without incurring significant error.

In the differential drive system 400, the distance traveled is equal to the average travel of both left and right wheels 402 and 404. Thus, when the differential drive system 400 turns in place, the distance traveled will be zero.

Figure 5:
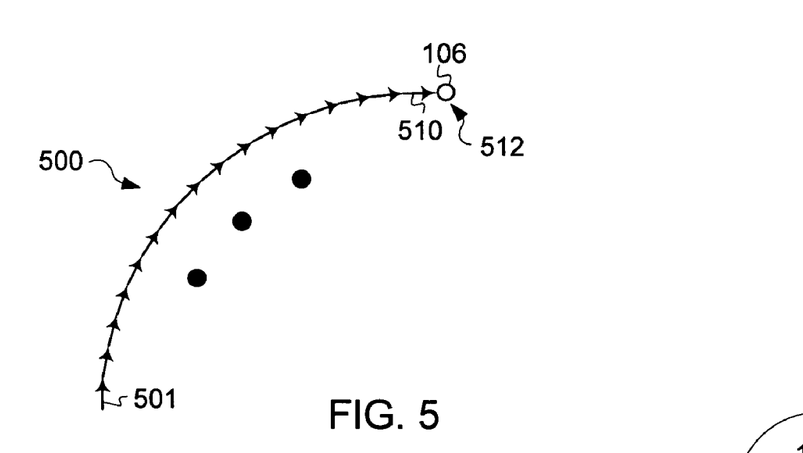
FIG. 5 is a view of a surrogate's forward motion path.

Referring now to FIG. 5, therein is shown an example of a surrogate forward motion path 500. To simplify the FIGS. and discussion, it is assumed that the position information is logged once every second. In practice, a logging frequency of 10 times per second would be more common.) For purposes of illustration, the surrogate forward motion path 500 is shown as line segments 501 through 510, each of which is represented by an arrow indicating one second of surrogate movement. The surrogate 106 is assumed to have determined that the wireless signal has been lost at the end of the tenth second 510 of surrogate movement at a point 512.

Figure 6:
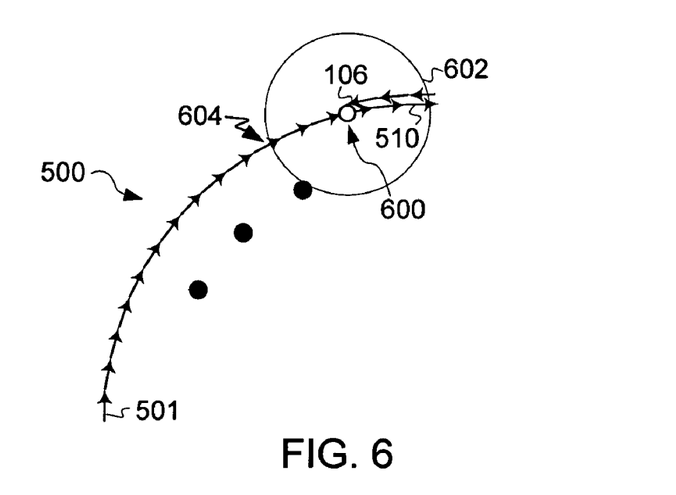
FIG. 6 is a view of an approximation of a point that the surrogate can be expected to reach after initiating backtracking.

Referring now to FIG. 6, therein is shown an approximation of a point 600 that the surrogate 106 can be expected to reach moving at its pre-specified backtracking speed S in the next time interval T after initiating backtracking. In reality, the surrogate 106 cannot reach all points on a circle 602 in equal time, since it cannot change the direction of its motion quickly. To be more accurate, an oval could be used for the possible backtracking distance of the surrogate 106 instead of the circle 602. However, the approximation works since the curvature of the forward path is also limited.

Once the surrogate 106 has entered backtracking mode, it navigates along its recent path in the reverse direction. For example, the surrogate 106 could reverse the last 10 seconds of its motion. During backtracking, it is best if the surrogate 106 does not travel at high speed. Therefore, backtracking may take longer than the original forward motion. However, backtracking should not take too long, because any undue delay increases the amount of time that the user 124 is left incommunicado.

During backtracking, the surrogate's computer/transceiver system 122 of FIG. 1A will compute its expected position every sampling interval T (e.g., 100 ms) and compute a direction for the next time period. Given a pre-specified backtracking speed S (e.g., 0.5 ft/sec or 0.15 meters/sec), the surrogate's computer/transceiver system 122 can find a point on the original forward path that is a distance D=S/T away from its current position. This point is a point that the surrogate 106 can be expected to reach traveling at its pre-specified backtracking speed S in the next time interval T.

Thus, a waypoint for the end of a backtracking interval will be on the intersection of a horizontal circle, such as the horizontal circle 602, and the line segments of the forward path, such as the surrogate forward motion path 500. Such a waypoint would be a waypoint 604.

Once the surrogate 106 has been backtracking for several time intervals T, the D radius horizontal circle 602 will intersect the surrogate forward motion path 500 at two points. When there is more than one intersection, the intersection with the oldest timestamp (as computed via interpolation from its endpoints) is chosen as the next waypoint. If the surrogate 106 is backtracking near its original forward speed, then an intersecting segment should have one endpoint inside the circle and one outside the circle. This means that the distance from the present surrogate position to the one endpoint will be greater than or equal to D, and the distance to the other segment endpoint will be less than or equal to D.

However, if the surrogate 106 is moving significantly slower during backtracking than during the original forward motion, the circle may intersect a single segment in more than one place. In this case, all segment endpoints will be at a distance greater than D from the current surrogate position. To handle a general case, each line segment is tested for intersection with the circle, and the intersection with the oldest timestamp is chosen.

In addition to autonomous backtracking, the surrogate 106 is also capable of autonomous forward navigation, in situations where the user 124 cannot find an alternative path with better wireless coverage or the user 124 desires to travel along a known or previously determined route to a specified destination at the remote location.

Figure 7:
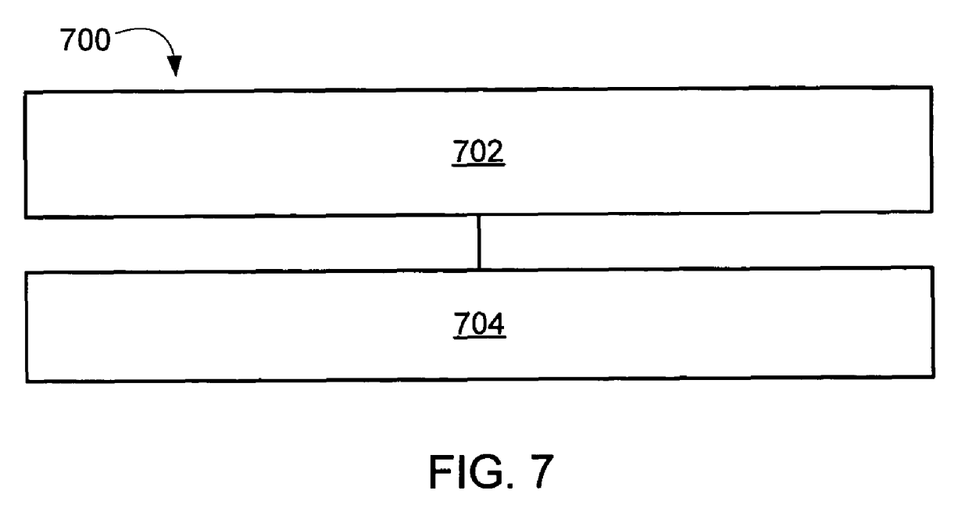
FIG. 7 is a block diagram of a method of mobile device control in accordance with an embodiment of the present invention.

Referring now to FIG. 7, therein is shown a method 700 of mobile telepresencing including: a block 702 of providing a surrogate moved under wireless control; and a block 704 of moving the surrogate in reverse when the wireless control is lost.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters hither-to-fore set forth herein or shown in the accompanying drawings are to be interpreted in an illustrative and non-limiting sense.

The invention claimed is:

1. A method of mobile device control comprising:
   moving a surrogate under wireless control by a user;
   during the moving, detecting unsuitable degradation of wireless communications of the wireless control; and
   in response to the detecting and while the surrogate is still receiving the wireless communications, autonomously moving the surrogate to provide suitable wireless communications of the wireless control;
   wherein the detecting comprises comparing a performance parameter associated with the wireless communications with a threshold.

2. The method as claimed in claim 1 additionally comprising autonomously moving the surrogate along a previously determined route.

3. The method as claimed in claim 1 wherein autonomously moving the surrogate to provide suitable wireless communications of the wireless control occurs after the passage of the period of time following the detecting of the degradation; and
   the method further comprises after the detecting of the unsuitable degradation, the surrogate loitering near a location where the unsuitable degradation was detected during the passage of the period of time.

4. The method as claimed in claim 1 wherein:
   the autonomously moving of the surrogate uses logged information of forward movement using at least one of dead reckoning, odometry, directional measurement, differential wheel rotation, or a combination thereof; and
   the autonomously moving of the surrogate uses waypoints back along a forward movement path for backtracking movement.

5. The method as claimed in claim 1 wherein the detecting comprises determining that a current non-zero data rate at which the surrogate is successfully transmitting data via the wireless communications is less than a desired data rate.

6. The method as claimed in claim 5 further comprising prior to the detecting, wirelessly transmitting a video signal at or above the desired data rate from the surrogate to the user.

7. The method as claimed in claim 1 wherein the detecting comprises determining that a current transmission delay associated with packets received by the surrogate is greater than an acceptable transmission delay.

8. A method of mobile telepresencing comprising:
   moving a surrogate under real-time wireless control by a user;
   autonomously moving the surrogate to an area with adequate wireless coverage to regain wireless control when the wireless control is lost for a period of time;
   while the surrogate is autonomously moving, activating a human perceptible indicator which is perceptible to humans in the presence of the surrogate; and
   prior to autonomously moving the surrogate, determining that the loss of the wireless control has persisted for the period of time, wherein the period of time is at least two seconds.

9. The method as claimed in claim 8 wherein:
   the losing of wireless control includes degradation of the control to a threshold level; and
   the autonomously moving of the surrogate to regain wireless control occurs after the period of time.

10. The method as claimed in claim 8 wherein the autonomously moving of the surrogate includes:
    backtracking while measuring distance and avoiding collisions by the surrogate;
    stopping the surrogate for an obstacle; and
    resuming backtracking after removal of the obstacle.

11. The method as claimed in claim 10 further comprising prior to the resuming of the backtracking, the surrogate is configured to sense removal of the obstacle, wherein the resuming is responsive to the sensing.

12. The method as claimed in claim 10 wherein the resuming backtracking comprises automatically without user intervention resuming backtracking.

13. The method as claimed in claim 8 wherein:
the autonomously moving of the surrogate uses logged information of forward movement using at least one of dead reckoning, odometry, directional measurement, differential wheel rotation, or a combination thereof;
the autonomously moving of the surrogate uses a slower speed than a forward speed; and
the autonomously moving the surrogate uses waypoints back along a forward movement path for backtracking movement considering the slower speed of backtracking.

14. The method as claimed in claim 8 wherein the surrogate comprises the human perceptible indicator.

15. A mobile device control system comprising:
a surrogate movable under wireless control by a user; and
a computer/transceiver system on the surrogate to move the surrogate to regain wireless control independently of the wireless control after passage of a nonzero amount of time following a loss of the wireless control;
wherein the computer/transceiver system is configured to move the surrogate after the computer/transceiver system has determined that the loss of wireless control has persisted for the non-zero amount of time; and
the computer/transceiver system is configured to detect the loss of the wireless control, to configure the surrogate to loiter for the non-zero amount of time following the loss of the wireless control near a location at which the loss of the wireless control was detected, and to monitor for return of the wireless control during the non-zero amount of time.

16. The system as claimed in claim 15 wherein the computer/transceiver system is configured to autonomously move the surrogate to regain wireless control after the surrogate remains stationary for the non-zero amount of time unless wireless control has been regained.

17. The system as claimed in claim 15 wherein the computer/transceiver system is configured to move the surrogate by measuring a distance and avoiding a collision.

18. The system as claimed in claim 15 wherein:
the computer/transceiver system is configured to use logged information of forward movement using at least one of dead reckoning, odometry, directional measurement, differential wheel rotation, or a combination thereof; and
the computer/transceiver system is configured to calculate waypoints back along a forward movement path for backtracking movement.

19. The system as claimed in claim 15 wherein the loitering comprising remaining substantially stationary for the non-zero amount of time following the loss of the wireless control near a location at which the loss of the wireless control was detected.

20. The system as claimed in claim 15 wherein the computer/transceiver system is configured to determine that a first non-zero data rate at which the surrogate is successfully transmitting data via the wireless control at a first moment in time is less than a desired data rate and as a result of the determining, is configured to move the surrogate so that the surrogate transmits data via the wireless control at a second non-zero data rate that is greater than or equal to the desired data rate at a second moment in time after the first moment in time.

21. A mobile telepresencing system comprising:
a surrogate movable under wireless control by a user; and
a computer/transceiver system configured to determine when the wireless control is lost and, responsive to the determining, to autonomously move the surrogate to an area not currently receiving adequate coverage of the wireless control, but in which the surrogate previously experienced adequate coverage of the wireless control, and wait in the area until adequate coverage of the wireless control is regained.

22. The system as claimed in claim 21 wherein the computer/transceiver system is configured to autonomously move the surrogate along at least one of a previously determined route, a distance, a destination, a direction, or a combination thereof.

23. The system as claimed in claim 21 wherein:
the computer/transceiver system is configured to determine degradation of the wireless control to a threshold level; and
the computer/transceiver system is configured to autonomously move the surrogate to regain wireless control after a period of time.

24. The system as claimed in claim 21 wherein the computer/transceiver system includes:
backtracking means for measuring a distance and avoiding a collision by the surrogate during backtracking;
stopping means for stopping the surrogate for an obstacle; and
means for resuming backtracking after removal of the obstacle.

25. The system as claimed in claim 24 wherein the means for resuming backtracking after removal of the obstacle comprises means for automatically without user intervention resuming backtracking after removal of the obstacle.

26. The system as claimed in claim 21 wherein:
the computer/transceiver system is configured to use logged information of forward movement using at least one of dead reckoning, odometry, directional measurement, differential wheel rotation, or a combination thereof for backtracking;
the computer/transceiver system is configured to provide a slower speed than a forward speed for backtracking by the surrogate; and
the computer/transceiver system is configured to use waypoints back along a forward movement path for backtracking movement considering the slower speed of backtracking.

27. The system as claimed in claim 21 wherein the computer/transceiver system is configured to loiter in the area for the wireless control to return.

* * * * *